Patented Mar. 7, 1939

2,149,265

UNITED STATES PATENT OFFICE 2,149,265

PURIFIED ALCOHOL SULPHATES AND PROCESS OF MAKING THE SAME

Hans Beller and John J. Owen, Baton Rouge, La.

No Drawing. Application September 23, 1936, Serial No. 102,172

5 Claims. (Cl. 260—99.12)

The present invention relates to a method of purifying sulphated alcohol products, or sulphated olefine products obtainable from olefines described in U. S. Patent 1,965,962, or sulphated mixtures of such olefines and alcohols, for the purpose of manufacturing valuable assistants in the textile and related industries.

It has already been proposed to prepare such assistants by subjecting alcohols of high molecular weight, containing more than 10 carbon atoms in the molecule, or olefines, admixtures of olefines and alcohols of similar molecular weight range, to the action of sulphonating agents, such as concentrated sulphuric acid, fuming sulphuric acid or chlorosulphonic acid, if desired in the presence of agents capable of removing water, such as acid anhydrides, for example, acetic anhydride, and/or of inert diluents, such as carbontetrachloride, diethyl ether, and the like. Valuable products are obtained in this way when the alcohols, or olefines, or mixtures of olefines and alcohols of similar molecular weight range which are subjected to the sulphonation are in a comparatively pure state; but if they are mixed with other organic substances, and are not in a pure state, the resulting sulphates will be more or less impaired in their value as assistants in the textile and related industries.

Such impure mixtures are obtained more particularly in the liquid phase oxidation of aliphatic hydrocarbons of high molecular weight, for example, according to the process described in U. S. Patent 1,909,295, issued May 16, 1933. The liquid phase oxidation products usually consist of mixtures of alcohols containing from 10 to 25 carbon atoms with non-oxidized initial hydrocarbons, and products other than alcohols, produced by the same liquid phase oxidation, for example, acids, esters, aldehydes, ketones, lactones, estolides, and the like. The sulphonation of the latter products is usually not performed as easily as that of the alcohols. Moreover, the products obtained by the sulphonation of the substances other than alcohols do not exert the valuable properties of the alcohol sulphonates. From a technical point of view it is rather difficult to free the alcohols from the other non-saponifiable constituents; moreover, this purification can usually be performed only with a loss of alcohols.

We have now found that most valuable assistants in the textile and related industries, more particularly excellent wetting, washing, and deterging agents can be obtained by subjecting alcohols containing from 10 to 25, preferably from 12 to 20, carbon atoms in their molecule, or olefines, or mixtures of olefines and alcohols of similar molecular weight range, to the action of a sulphonating agent, if desired after removal of any acid, i. e. saponifiable, constituents originally admixed with the alcohols, neutralizing the products resulting from acid sulphonation by means of caustic alkalis, preferably by means of concentrated aqueous solutions of caustic soda or potash, adding a water-soluble inorganic salt to the neutralized solution, and extracting the latter with an ether of less than 6 carbon atoms per molecule, thereby freeing the neutralized sulphonated products from non-sulphonated and non-sulphatable matter. The addition of a water-soluble inorganic salt to the neutralized solution serves to avoid troublesome emulsions which would be formed during the subsequent extraction of the solution with an ether in the absence of such inorganic salt. Such salt acts as an emulsion breaker. Ordinary extraction with ether alone is therefore impractical. The extraction of the sulphonated products may be performed with the addition of inorganic salts either before or after the neutralization of the sulphonation mixture. Thereby our process includes the extraction of acid esters, sulphonic acids and their salts from the crude sulphonation product.

The usual method of extracting the neutralized sulphonation product as, for instance, exemplified in U. S. Patent No. 1,993,375, issued March 5, 1935, involves the use of at least two volatile solvents, for example, gasoline fractions plus ethyl alcohol, or similar mixtures, and still other solvents may be necessary in the sulphonation process proper, with certain types of initial alcohols. The present process purports to reduce the number of extraction solvents to one. This may be accomplished, for instance, by using ether as an inert diluent during the sulphonation process and as an extraction agent in the subsequent purification step of the neutralized product in the particular manner indicated below.

The said ethers suitable for extraction comprise dimethyl ether, di-isopropyl ether, as well as members of the class of mixed ethers, such as methyl ethyl ether, and so on.

The extraction is usually carried out at temperatures between about 0° C. and the boiling point of the solvent used. Temperatures ranging between about 15° C. and about 30° C. are, however, preferably employed for the extraction. If desired, the extraction may be carried out in a closed apparatus, in which case it is possible to work at temperatures above the boiling point of the extraction agent.

The initial materials suitable for the sulphonation comprise, for example, the alcohol containing mixtures obtainable for example, according to application Ser. No. 433,840, filed March 6, 1930, by catalytic reduction of hydrogenation of aliphatic monocarboxylic acids and esters thereof, such as fatty oils, fats and waxes, for example, esters of oleic, linoleic or train oil acids, cotton seed, sunflower seed acids, and the like, as well as the free acids themselves, these hydrogenation products usually containing, besides alcohols of high molecular weight, free fatty acids, esters, aldehydes, ketones, and the like. Suitable initial materials may also be obtained by the liquid phase oxidation of aliphatic hydrocarbons of high molecular weight, such as paraffin wax, paraffin oil and montan wax, these oxidation products being, if so desired, subjected, prior to sulphonation, to a catalytic reduction by means of hydrogen, for example, according to Ser. No. 486,280, filed October 3, 1930. Suitable initial materials for the sulphonation also comprise single, saturated and unsaturated, aliphatic alcohols, having the aforesaid number of carbon atoms, such as dodecyl, cetyl or oleyl alcohols.

The sulphonation of the alcohol containing mixtures which may be accomplished by means of concentrated sulphuric acid, fuming sulphuric acid, and more particularly chlorosulphonic acid, may be carried out at temperatures between about 0° C. and about 30° C., or with variations of the temperature during sulphation, if desired in the presence of the aforesaid solvents, such as carbontetrachloride, or diethyl ether, and/or of water-absorbing agents such as acetic acid anhydride, and usually produces sulphuric esters of the initial alcohols, that is products in which one or more $SO_3H$ groups are connected to a carbon atom by means of an oxygen atom. Sulphonic acids may also result as products of the sulphonation. The neutralization of the said sulphuric esters or sulphonic acids is preferably carried out by incorporating the sulphonation mixture with a concentrated aqueous solution of caustic alkali or carbonates, or with organic bases such as triethanol amine or other suitable basic agents. The neutralized crude sulphonation product thus obtained is usually extracted with from 0.5 to 4, preferably with 1 times its weight of the aforementioned extracting agents, this extraction being repeated several times, but usually 3 or 4 extractions are sufficient for practically completely freeing the neutralized sulphonation product from all foreign substances. Sulphur trioxide is also a suitable sulphating agent.

The extraction may be carried out continuously by allowing the sulphated mixture or the neutralized sulphated mixture each containing the proper concentration of dissolved inorganic salt, in water solution or mixed with water, to flow downwards through a tower packed with compact filler bodies such as balls made from quartz, glass or other ceramic materials, etc., at the bottom of which tower a current of said solvent is led upwards. The resulting solution of the non-sulphonated and non-sulphatable products is withdrawn at the top of the tower, while the solution of pure sulphonates is drawn off at the bottom.

Mixers, settling tanks or other known methods for continuous extraction are used in this step.

*Example*

A total of 129 grams of distilled crude scale wax alcohols which were prepared from oxidation products of crude scale wax by extraction and hydrogenation processes, are dissolved in 129 cc. of petroleum ether solvent and sulphated at 19–22° C., using the theoretical amount of chlorosulphonic acid dissolved in 20 cc. of ethyl ether. After a total reaction period of 30 minutes, the sulphated reaction mixture is neutralized by cautiously pouring into 10% sodium hydroxide solution containing sufficient cracked ice to keep the neutralization temperature below 20° C. To keep the proper pH value in the solution during subsequent operations, 5 grams of crystallized trisodium phosphate ($Na_3PO_4.12H_2O$) dissolved in water, are added. A total of 770 cc. of solution is obtained.

When 30 cc. portions of the alkaline sulphate solution are shaken vigorously with 30 cc. of diethyl ether, emulsions which break with extreme slowness are formed. However, when 1 gram of sodium sulphate is dissolved in 30 cc. of the soap solution and this is shaken with 30 cc. of the purified ether, the emulsion breaks readily. Accordingly, 680 cc. out of the total of 770 cc. of neutralized sulphation reaction mixture, corresponding to 114 grams of charge alcohols, in which 31 grams of anhydrous sodium sulphate ($Na_2SO_4$) have been dissolved, are extracted four times with 250 cc. portions of the purified diethyl ether and filtered. The purified diethyl ether extracts are combined and washed once with 200 cc. of water, to which 5 grams of anhydrous sodium sulphate have been added in order to remove traces of alkyl sulphate dissolved in the ether. The wash water after filtration is added to the main soap solution which is then evaporated on a steam bath to a thick paste which is further dried by spreading on a glass plate and allowing to stand at room temperature for 88 hours under vacuum.

The diethyl ether is removed from the unsulphated and unsulphatable material on a steam bath, the last traces being taken out with a stream of natural gas. A yield of 38% of unsulphated material (based on the weight of alcohols charged) is obtained which has a hydroxyl number of 7 and an acid number of 0.34. Analysis of the soap shows that the free fatty matter content has been reduced from 25% in the unextracted sulphated product to 1.50% in the extracted soap. This value can readily be reduced by increasing the numbers of extraction or the volume of diethyl ether used.

It is not intended to limit the type of alcohols to those used in the example, since the present method is applicable to the extraction of the neutralized sulphation reaction mixture, diluted with the proper amount of water, obtainable by the sulphation of any non-aromatic type of alcohol.

It will be observed that the usual method of extraction as shown, for instance, in the aforementioned U. S. Patent No. 1,993,375, involves the use of at least two volatile solvents, and other solvents may be necessary in the sulphation process with certain types of crude alcohols. The present process, therefore, reduces the number of solvent recovery systems necessary in plant operation, to one.

Although diethyl ether is used in the present experiment, the use of any other type of simple or mixed ethers or halogen substituted ethers of either type containing less than 6 carbon atoms per molecule is to be comprehended in the scope of applicants' claims.

What we claim is:

1. The process for the production and purification of high molecular sulphonation products which comprises subjecting mixtures of high molecular non-aromatic compounds containing aliphatic compounds selected from the class consisting of alcohols containing from 10 to 25 carbon atoms, olefines and mixtures of alcohols and olefines of similar molecular weight range, to the action of a sulphonation agent, neutralizing the products resulting from such sulphonation by means of an alkaline reacting substance, adding a water-soluble inorganic salt to the neutralized solution, and extracting the latter with an ether containing less than 6 carbon atoms in its molecule, thereby freeing the neutralized sulphonated products from non-sulphonated and non-sulphatable matter.

2. The process for the production and purification of products reacted with sulphonating agents which comprises subjecting the liquid phase oxidation products of normally liquid or solid non-aromatic hydrocarbons selected from the group consisting of alcohols containing from 10 to 25 carbon atoms, olefines and mixtures of olefines and alcohols of similar molecular weight range, to the action of a sulphonating agent, neutralizing the products resulting from sulphonation, adding a water-soluble inorganic salt to the neutralized solution, and extracting the latter with an ether of less than 6 carbon atoms per molecule, thereby freeing the neutralized sulphonated products from non-sulphonated and non-sulphatable matter.

3. The process for the production and purification of products reacted with sulphonating agents which comprises subjecting the liquid phase oxidation products of normally liquid or solid non-aromatic hydrocarbons selected from the group consisting of alcohols containing from 12 to 20 carbon atoms, olefines and mixtures of olefines and alcohols of similar molecular weight range, to the action of a sulphonating agent, neutralizing the products resulting from sulphonation by means of caustic alkalis adding a water-soluble inorganic salt to the neutralized solution, and extracting the latter with an ether of less than 6 carbon atoms per molecule, thereby freeing the neutralized sulphonated products from non-sulphonated and non-sulphatable matter.

4. The process for the production and purification of products reacted with sulphonating agents which comprises subjecting the liquid phase oxidation products of normally liquid or solid non-aromatic hydrocarbons selected from the group consisting of alcohols containing from 10 to 25 carbon atoms, olefines and mixtures of olefines and alcohols of similar molecular weight range, to the action of a sulphonating agent, adding a water-soluble inorganic salt to the neutralized solution, extracting the latter with an ether of less than 6 carbon atoms per molecule, and neutralizing the sulphonation mixture.

5. The process for the production and purification of products reacted with sulphonating agents which comprises subjecting a mixture of alcohols obtainable from oxidation products of crude scale wax by extraction and hydrogenation, to the action of chlorosulphonic acid in ethyl ether solution at a temperature of from 19–22° C., neutralization of the reaction mixture by pouring it into 10 per cent sodium carbonate solution, care being taken that the neutralization temperature does not exceed 20° C., adding anhydrous sodium sulphate to the neutralized solution, and extracting the latter with diethyl ether, thereby freeing the neutralized reaction mixture from non-sulphonated and non-sulphatable matter.

JOHN J. OWEN.
HANS BELLER.